US008707456B2

(12) United States Patent
Kim et al.

(10) Patent No.: US 8,707,456 B2
(45) Date of Patent: Apr. 22, 2014

(54) METHOD AND SYSTEM FOR INTEGRATING REMOTE DEVICES INTO A DOMESTIC VLAN

(75) Inventors: Yongbum Kim, San Jose, CA (US); Bruce Currivan, Dove Canyon, CA (US); Wael Diab, San Francisco, CA (US); Jeyhan Karaoguz, Irvine, CA (US); Kenneth Ma, Cupertino, CA (US); Michael Johas Teener, Santa Cruz, CA (US)

(73) Assignee: Broadcom Corporation, Irvine, CA (US)

( * ) Notice: Subject to any disclaimer, the term of this patent is extended or adjusted under 35 U.S.C. 154(b) by 487 days.

(21) Appl. No.: 12/796,152

(22) Filed: Jun. 8, 2010

(65) Prior Publication Data
US 2011/0023125 A1   Jan. 27, 2011

Related U.S. Application Data

(60) Provisional application No. 61/228,302, filed on Jul. 24, 2009.

(51) Int. Cl.
*G06F 15/16* (2006.01)
*G06F 21/00* (2013.01)

(52) U.S. Cl.
USPC ............. 726/29; 709/223; 709/225; 709/238; 726/15; 726/27

(58) Field of Classification Search
USPC ................. 726/15, 27, 29; 709/223, 225, 238
See application file for complete search history.

(56) References Cited

U.S. PATENT DOCUMENTS

| 6,970,459 | B1 * | 11/2005 | Meier | 370/389 |
|---|---|---|---|---|
| 7,062,566 | B2 * | 6/2006 | Amara et al. | 709/229 |
| 7,340,769 | B2 * | 3/2008 | Baugher | 726/5 |
| 7,370,346 | B2 * | 5/2008 | Congdon | 726/4 |
| 7,505,434 | B1 * | 3/2009 | Backes | 370/331 |
| 7,685,254 | B2 * | 3/2010 | Pandya | 709/217 |
| 7,936,670 | B2 * | 5/2011 | Cazares et al. | 370/230 |

(Continued)

OTHER PUBLICATIONS

Kim, T., Oh, Y., Lee, H., Paik, E., Park, K., "Implementation of the DLNA Proxy System for Sharing Home Media Contents" Consumer Electronics, IEEE Transactions on Feb. 2007. Electron. & Telecommun. Res. Inst. vol. 53, Issue 1, pp. 139-144. [retreived from IEEE database].*

(Continued)

*Primary Examiner* — Kambiz Zand
*Assistant Examiner* — Shiuh-Huei Ku
(74) *Attorney, Agent, or Firm* — Brinks Gilson & Lione

(57) ABSTRACT

A gateway network device may establish secure connections to a plurality of remote network devices using tunneling protocols to distribute to the remote network devices multimedia content received from one or more content providers. The consumption of the multimedia content may originally be restricted to local network associated with the gateway network device. The secure connections may be set up using L2TP protocol, and the L2TP tunneling connections may be secured using IPSec protocol. Use of multimedia content may be restricted based on DRM policies of the content provider. DRM policies may be implemented using DTCP protocol, which may restrict use of the multimedia content based on roundtrip times and/or IP subnetting. Each content provider may use one or more VLAN identifiers during communication of the multimedia content to the gateway network device, and the gateway network device may associate an additional VLAN identifier with each secure connection.

11 Claims, 5 Drawing Sheets

(56) References Cited

U.S. PATENT DOCUMENTS

| | | | |
|---|---|---|---|
| 7,958,256 B2* | 6/2011 | Keeler | 709/233 |
| 8,005,049 B2* | 8/2011 | Cheng et al. | 370/331 |
| 8,170,037 B2* | 5/2012 | Polcha et al. | 370/401 |
| 8,229,705 B1* | 7/2012 | Mizrahi et al. | 702/182 |
| 8,259,569 B2* | 9/2012 | Banerjee et al. | 370/230 |
| 2006/0056297 A1* | 3/2006 | Bryson et al. | 370/230 |
| 2010/0138900 A1* | 6/2010 | Peterka et al. | 726/4 |

OTHER PUBLICATIONS

Walker, J., Morris, O.J., Marusic, B. "Share it!—the architecture of a rights-managed network of peer-to-peer set-top-boxes". EUROCON 2003. Computer as a Tool. The IEEE Region 8. Sep. 22-24, 2003; NDS, Chandlers Ford, UK vol. 1 pp. 251-255 [retrieved from IEEE database].*

* cited by examiner

METHOD AND SYSTEM FOR INTEGRATING REMOTE DEVICES INTO A DOMESTIC VLAN

CROSS-REFERENCE TO RELATED APPLICATIONS/INCORPORATION BY REFERENCE

This patent application makes reference to, claims priority to and claims benefit from U.S. Provisional Patent Application Ser. No. 61/228,302 filed on Jul. 24, 2009.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for integrating remote devices into a domestic VLAN.

BACKGROUND OF THE INVENTION

Multimedia playback devices may be utilized to play multimedia streams received from broadcast head-ends and/or content providers. Multimedia streams may be received via wired connections and/or over wireless connections. For example, Television (TV) broadcasts may be transmitted by television head-ends over broadcast channels, via RF carriers. The TV head-ends may comprise terrestrial TV head-ends, Cable-Television (CATV), satellite TV head-ends, and/or Internet Protocol Unicast Multicast, and/or Broadcast head-ends. The TV head-ends may utilize, for example, a set of broadcast channels to facilitate TV broadcast. The TV broadcasts comprise transmission of video and/or audio information, wherein the video and/or audio information may be encoded into the broadcast channels via one of plurality of available modulation schemes. Multimedia streams may also be sometimes broadcasted via the Internet. Internet head-ends may be utilized, for example, to communicate multimedia streaming data, which may correspond to TV broadcasts or to dedicated multimedia content provided exclusively via the Internet, via the Internet based on one or more applicable networking standards, including TCP/IP. To protect against unwanted use and/or copying of broadcast multimedia, use of multimedia content may be restricted by use of Digital Rights Management (DRM) policies. DRM policies may comprise access control technologies that enable content providers to impose geographic limits on use of multimedia content to within homes and/or offices of subscribers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for integrating remote devices into a domestic VLAN, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for integrating remote devices into a domestic VLAN. In various embodiments of the invention, a gateway network device may establish secure connections with a plurality of remote network devices, utilizing one or more tunneling protocols, to distribute to the plurality of remote network devices via the secure connections multimedia content received by the gateway network device from one or more content providers. The consumption of the distributed multimedia content may originally be restricted to a plurality of local network devices that are communicatively coupled to a local network associated with the gateway network device, and the remote network devices would not originally be authorized to consume the distributed multimedia content prior to the distribution by the gateway network device, due to geographical remoteness. The secure connections may be set up using layer 2 tunneling protocol (L2TP), and these L2TP based tunneling connections may be secured using Internet Protocol Security (IPSec). Use of the multimedia content may be restricted based on a Digital Rights Management (DRM) policy of the content provider. The DRM policy may be implemented using Digital Transmission Content Protection (DTCP) protocol, which may restrict use of the multimedia content based on roundtrip times and/or IP subnets. Each content provider may utilize one or more VLAN identifiers during communication of the multimedia content to the gateway network device. The gateway network device may also associate with each secure connection an additional VLAN identifier that may be used to tag packets used to communicate the multimedia content to the remote network devices. Consequently, multimedia content distribution to remote network devices may comprise communicating double VLAN-tagged packets to the remote network devices during distribution of multimedia content to the remote network devices.

Figure 1A:
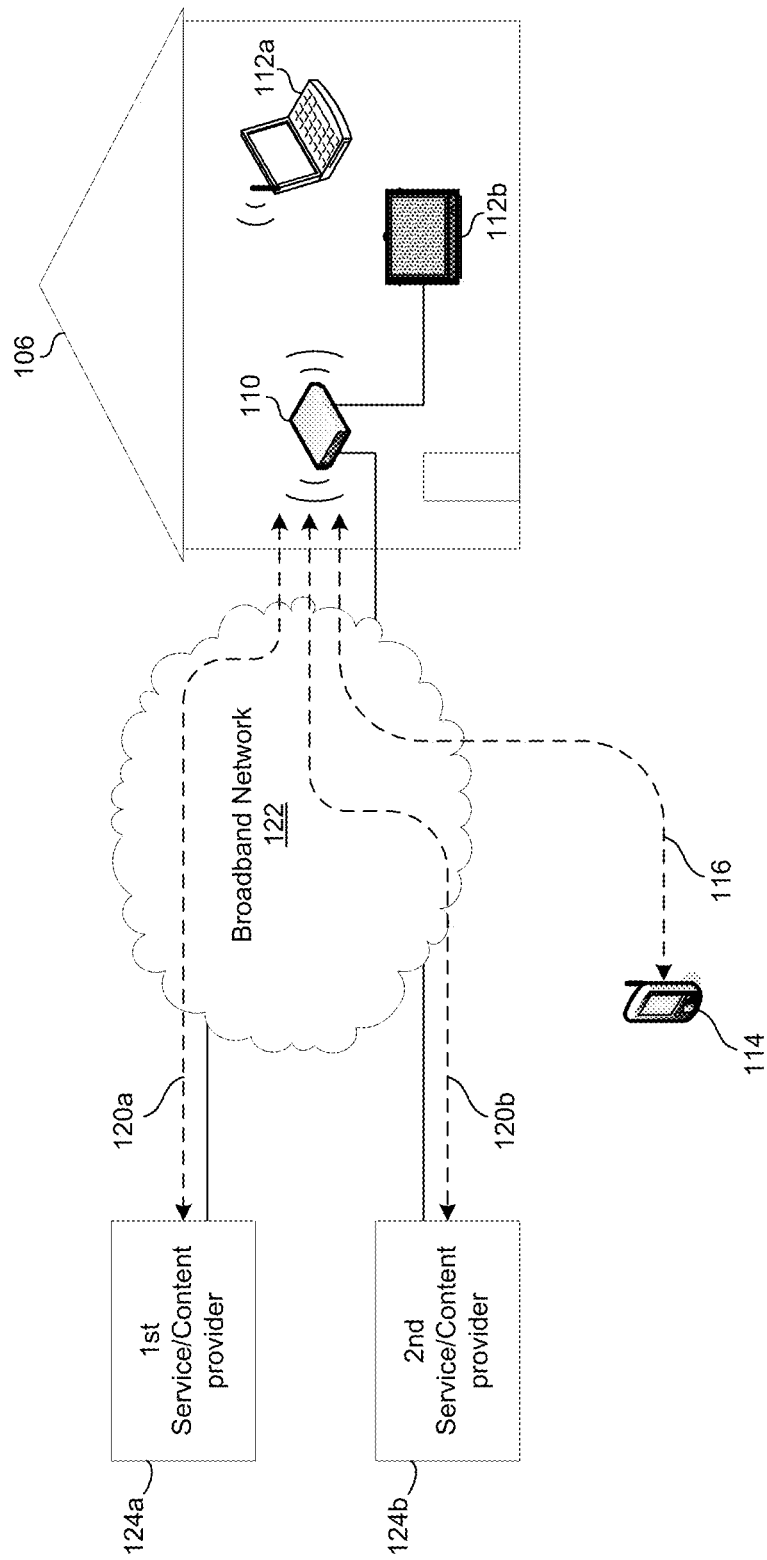
FIG. 1A is a block diagram that illustrates an exemplary communication network that enable distributing of multimedia content from content provides to a plurality of network devices, in accordance with an embodiment of the invention.

FIG. 1A is a block diagram that illustrates an exemplary communication network that enable distributing of multimedia content from content provides to a plurality of network devices, in accordance with an embodiment of the invention. Referring to FIG. 1A, gateway network device 110, local network devices 112a and 112b, remote network device 114, broadband network 122, and service/content providers 124a and 124b.

The service/content providers 124a and 124b may comprise equipment comprising suitable logic, circuitry, interfaces, and/or code operable to communicate multimedia and/or Internet content via connections 120a and 120b, respectively, over backhaul links into the broadband network 122. Multimedia and/or Internet content may comprise voice, audio and/or visual content comprising, video, still images, animated images, and/or textual content. The connectivity between the service/content providers 124a and 124b and the broadband network may be provided, for example, via one or more optical, wired, and/or wireless links. One or more of a variety of protocols, such as Ethernet, T1/E1, and xDSL may be utilized for communicating data over the connections 120a and 120b. The broadband network 122, may comprise, for example, a satellite network, cable network, DVB network, the Internet, or similar local or wide area networks, which are capable of conveying data which may comprise, but is not limited to, voice, Internet data, and/or multimedia.

The gateway network device 110 may be installed in a location 106 to manage distribution of multimedia content received, for example, via the broadband network 122, from service/content providers 124a and/or 124b. The location 106 may correspond a residence, a multi-tenant property, and/or a commercial property. Exemplary commercial properties may comprise stores, restaurants, offices, or municipal buildings. Exemplary residences may comprise single-family homes, home offices, and/or town-houses. Exemplary Multi-tenant properties may comprise residential and/or commercial tenants such as apartments, condos, hotels, and/or high rises. In this regard, the gateway network device 110 may comprise suitable logic, circuitry, interfaces, and/or code that may enable communication via the broadband network 122. The gateway network device 110 may also comprise suitable logic, circuitry, interfaces, and/or code to enable communicating the received multimedia content to a plurality of network devices, for example local network devices 112a and/or 112b, which may be associated with the gateway network device 110 via a local network. The communication of multimedia content from the gateway network device 110 to the local network devices 112a and/or 112b may be performed via wired and/or wireless links. Exemplary wireless protocols may comprise one or more cellular standards, such as CDMA, GSM, TDMA, GPRS, EDGE, UMTS/WCDMA, HSDPA, extensions thereto, and/or variants thereof; IEEE 802.11 based standards, and/or WiMAX based standards.

The local network devices 112a and 112b may each comprise suitable logic, circuitry, interfaces, and/or code that may be operable to communicate utilizing one or more wired and/or wireless standards. In this regard, each of the local network devices 112a and 112b may be operable to transmit and/or receive data via cellular, WiFi, and/or Fiber based links and/or connections to the gateway network device 110. Exemplary local network devices may comprise personal computers (PC), laptop computers, mobile phones, and/or personal multimedia players. The local network devices 112a and 112b may receive, process, and/or present multimedia content, and may additionally be enabled to run a web browser or other applications for providing Internet services to a user of the local network device 112a and/or 112b.

In some exemplary embodiments of the invention, the gateway network device 110 may be operable to perform one or more functions of a set-top-box. In this regard, the gateway network device 110 may be operable to transmit and/or receive multimedia via a multimedia network such as a satellite television network, a cable television network, and/or a digital video broadcast (DVB) network. Additionally, the gateway network device 110 may be operable to encrypt, decrypt, compress, decompress, encode, decode, transcode, present, scramble, descramble, or otherwise process multimedia content. The gateway network device 110 may then be operable to output multimedia content to the local network device 112a and 112b, which may be operable as multimedia devices such as monitors, speakers, and/or storage devices.

The remote network device 114 may comprise suitable logic, circuitry, interfaces, and/or code that may be operable to establish communication links with the gateway network device 110 via the broadband network 122. Exemplary remote network devices may comprise personal computers (PC), laptop computers, mobile phones, and/or multimedia players. In an exemplary aspect of the invention, the remote network device 114 may receive, process, and present multimedia content distributed by the gateway network device 110 via the broadband network 122, and may additionally be operable to run a web browser or other applications for providing interactive access to a user of the remote network device 114.

In operation, the gateway network device 110 may receive multimedia content from one or both of the service/content providers 124a and 124b. The gateway network device 110 may be operable to, for example, process received Internet packets, communicated via the broadband network 122, which may comprise multimedia data. The gateway network device 110 may store and/or forward received data to one or more of the local network devices 112a and 112b. After processing the received packets, to extract the multimedia content for example, the gateway network device 110 may store and/or forward received data to one or more of the local network devices 112a and 112b. For security purposes, use of multimedia content communicated by the service/content providers 124a and 124b may be restricted. For example, in instances where the service/content providers 124a and 124b may correspond to cable TV providers, use of restriction technologies may ensure that only subscribers may access the communication data, and that the use is further limited to a geographical location—e.g., a residence or an office.

The use of multimedia content may be restricted, for example, by use of Digital Rights Management (DRM) policies. DRM policies may comprise access control technologies that enable content providers to limit use of multimedia content. For example, the Digital Living Network Alliance (DLNA), which represents many manufacturers of consumer electronics, has adapted Digital Transmission Content Protection (DTCP) as their current DRM to enable purchasers of entertainment devices to share multimedia content across home based networks. DTCP is a DRM based technology that aims to restrict digital home technologies, including DVD players and televisions, to permit distribution of such multimedia content to other devices, such as personal computers or portable media players, where these other devices also implement the DTCP.

The DTCP standard imposes various requirements to ensure that distributed multimedia content may be used securely. For example, the DTCP standard imposes a roundtrip requirement, typically 7 milliseconds, for any request for authentication to be honored. Another requirement imposed by the DTCP standard is the use of a single IP subnet—i.e., the requesting device must be on the same subnet as the device that actually receives the multimedia content. An IP subnet may comprise a plurality of networked computers and devices that may have a common, designated IP address routing prefix.

Furthermore, virtual local area network (VLAN) tagging may be utilized used to enable service/content providers to unequally designate their multimedia content. A VLAN may comprise groups of devices that may share a plurality of common requirements, and which may communicate as if they were directly attached regardless of their physical location. Use of VLAN may allow the devices to be grouped together even if they are not located on the same routers and/or switches. For example, each of the service/content providers 124a and/or 124b may be associated with one or more VLAN Identifiers (VIDs), which may be utilized to designate packets, which may carry multimedia content, communicated to the gateway network device 110. Based the VIDs recovered from received packets, the gateway network device 110 may determine the characteristics and/or attributes of corresponding VLAN to which the received packet belongs, and may control its distribution of the multimedia content based on the characteristics, to a plurality of other devices beyond the gateway network device 110 for example. The VIDs used by the service/content providers 124a and/or 124b may limit use of the multimedia content to the local network devices 112a and/or 112b within the location 106.

In an exemplary aspect of the invention, the gateway network device 110 may be operable to distribute the multimedia content to a plurality of remote network devices, which may normally be prohibited from using that multimedia content. The service/content providers 124a and/or 124b may authorize distribution of communicated multimedia content where the gateway network device 110 may be able to ensure secure communication of the multimedia content to a limited group of remote devices. For example, the gateway network device 110 may utilize secure tunneling communications to ensure that a specific group of remote devices may be able to receive and use multimedia content received from service/content providers 124a and/or 124b. Various tunneling protocols may be used to enable such tunneling communication. Tunneling protocols may be used to communicate payloads over incompatible and/or un-trusted networks via secure paths. An exemplary tunneling protocol that may be used is Layer 2 Tunneling Protocol (L2TP). The L2TP protocol, however, does not provide any encryption or confidentiality by itself. Accordingly, additional security protocols may be used to provide encryption and/or authentication within the tunnel to ensure security and/or privacy. An exemplary security protocol that may be used in conjunction with the L2TP protocol to provide secure tunneling connections is the Internet Protocol Security (IPSec) protocol. For example, the gateway network device 110 may establish an L2TP/IPSec tunneling based secure connection 116 to the remote network device 114 to enable secured and/or private distribution of multimedia content received from the service/content providers 124a and/or 124b to the remote network device 114.

In instances where a VLAN based implementation is used to ensure secured distribution of multimedia content by the service/content providers 124a and/or 124b via the gateway network device 110 within the location 106, a secondary VLAN implementation may be used to enable distribution of the multimedia content to remote devices. For example, double VLAN-tagged packets, based on the IEEE 802.1Q-in-Q standard for example, which may comprise two levels of VLAN tagging, may be used enable expanding the VLAN space managed by the gateway network device 110 to include remote devices, for example remote network device 114. Accordingly, double-tagged packets may be communicated by the gateway network device 110 where a first level of the double-tagging may preserve the VLAN tags used by service/content providers 124a and/or 124b, and a second VLAN tag, which may use unique VIDs specified via the gateway network device 110, may be used by the gateway network device 110 to ensure that only specific remote devices, for example remote network device 114, may be permitted to receive multimedia content distributed by the gateway network device 110 external to the location 106. The use of secure tunneling connections and/or VLAN double-tagging may enable the gateway network device 110, where authorized by the service/content providers 124a and/or 124b, to overcome and/or simulate the requirements of DRM policies, based on DTCP standard for example, which may otherwise be used to limit distribution of multimedia content to within the location 106 and restrict use of such multimedia content external to the location 106.

Figure 1B:
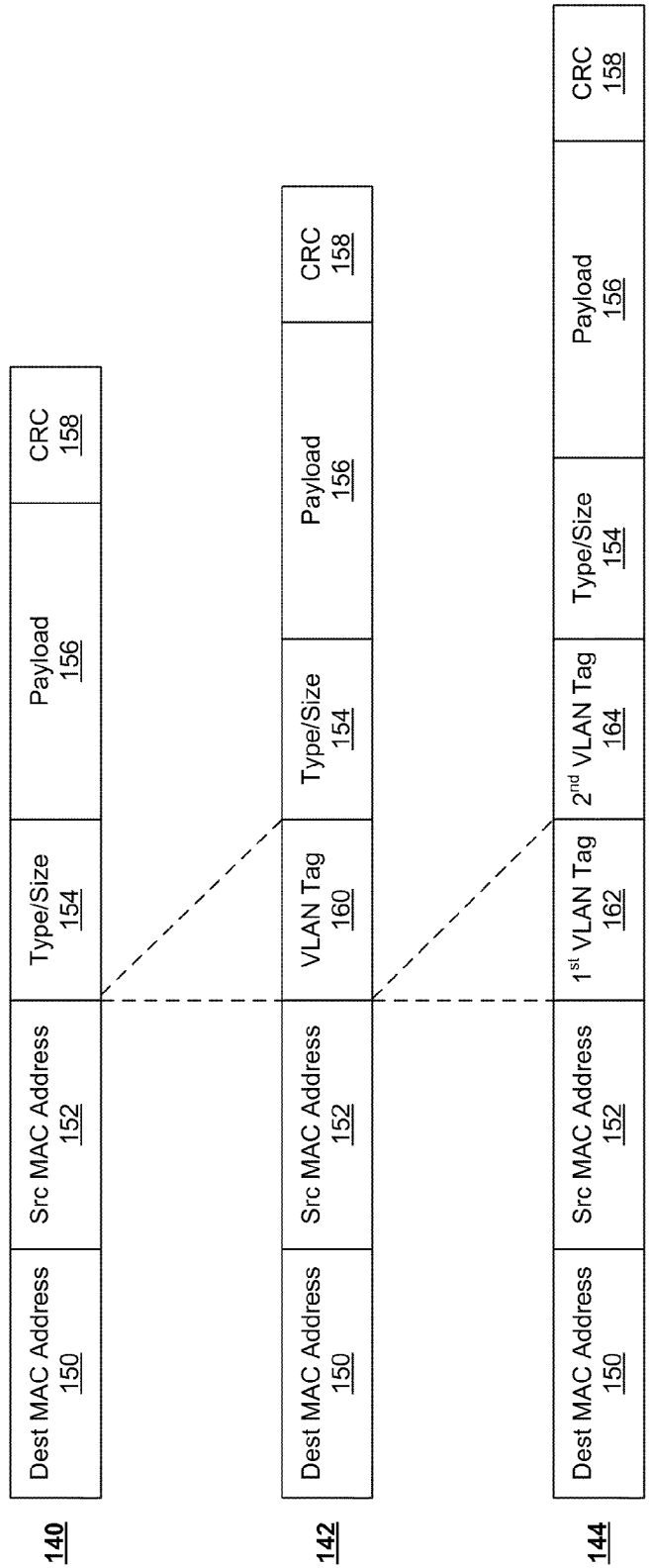
FIG. 1B is a block diagram that illustrates exemplary Ethernet packet structures utilized for extending domestic VLAN based connectivity to remote device, in accordance with an embodiment of the invention.

FIG. 1B is a block diagram that illustrates exemplary Ethernet packet structures utilized for extending domestic VLAN based connectivity to remote device, in accordance with an embodiment of the invention. Referring to FIG. 1B, there is shown exemplary Ethernet frames 140, 142, and 144.

The Ethernet frame 140 may comprise, for example, a destination MAC address 150, a source MAC address 152, a type/size field 154, a payload 156, and a cyclic redundancy check (CRC) field 158. The destination MAC address 150 may identify the MAC address for the network device where the Ethernet packet is destined. The source MAC address 152 may identify the MAC address for the network device from which the Ethernet packet was sent. The type/size field 154 may specify the type of Ethernet frame and the size of the payload 156. The payload 156 may comprise the data carried via the Ethernet frame 140. For example, the payload 156 may comprise actual data, and encapsulation headers and/or footers for applicable layers. The size of payload 156 is variable, and is between 46-1500 bytes. The CRC field 158 may be used to enable performing error detection and/or correction, based on the CRC algorithm, during Ethernet based communications.

The exemplary Ethernet frame 142 may represent an alternative structure for Ethernet frames communicated via Ethernet links. Similar to the Ethernet frame 140, the Ethernet frame 142 may also comprise the destination MAC address 150, the source MAC address 152, the type/size field 154, the payload 156, and the CRC field 158. The Ethernet frame 142, however, may additionally comprise a virtual local area network (VLAN) tag field 160, in conformity with IEEE 802.1Q, to generate VLAN tagged Ethernet frames, which may be utilized to enable VLAN routing, where applicable. The VLAN tag field 160 may comprise a VLAN Identifier (VID), and it may be used to facilitate routing of Ethernet packets between devices corresponding to the same VLAN grouping.

The exemplary Ethernet frame 144 may represent yet another alternative structure for Ethernet frames. Similar to the Ethernet frames 140 and 142, the Ethernet frame 144 may also comprise the destination MAC address 150, the source MAC address 152, the type/size field 154, the payload 156, and the CRC field 158. The Ethernet frame 144, however, may additionally comprise an outer VLAN tag field 162 and an inner VLAN tag field 164, in confirming with the IEEE 802.1Q-in-Q, to generate double-tagged Ethernet frames, which may be utilized to expanded VLAN space by enabling broader and/or more flexible packet routing capabilities. Each of the outer VLAN tag field 162 and an inner VLAN tag field 164 may be comprised similar to the VLAN tag filed 160 in Ethernet frame 142, and each of may comprise a different VID. The use of outer VLAN tag field 162 and an inner VLAN tag may allow routing Ethernet packets based on two-level VLAN grouping, wherein different routing rules and/or criteria may be applicable to different sub-groups of devices within a larger common VLAN space.

In operation, Ethernet packets, based on one or more the Ethernet frames 140, 142, and/or 144 may be utilized during operations via the gateway network device 110. For example, packets that may be based on Ethernet frame 140 may be utilized where no VLAN implementation are used. For example, because the gateway network device 110 and the local network device 112*b* may have direct connection, Ethernet packets based on the Ethernet frame 140 may be used to exchange data and/or messages.

In instances where a VLAN based implementation may be used, the Ethernet frame 142 may be used instead. For example, VLAN tagging may be used to limit use of multimedia content communicated by the service/content providers 124*a* and/or 124*b* to the location 106. Accordingly, packets comprising instances of the Ethernet frame 142 may be used to communicate the multimedia content from the service/content providers 124*a* and/or 124*b* to the gateway network device 110 via the broadband network 122, via VLAN based connections 120*a* and 120*b*, respectively. The gateway network device 110 may validate the VID parameter in the VLAN tag field 160 in the received packets to ensure that only permitted local devices may receive the multimedia content.

The Ethernet frame 144 may be utilized during secure distribution of multimedia content by the gateway network device 110 to, for example, the remote network device 114. In this regard, Ethernet frame 144 may be used to implement VLAN grouping between the gateway network device 110 and the remote device 114 while at the same time maintaining the VLAN grouping used by the service/content providers 124*a* and 124*b* to restrict use of communicated multimedia content. For example, the gateway network device 110 may receive multimedia content in Ethernet frames 142 from service/content providers 124*a* and 124*b* for local consumption in the location 106. To facilitate secure distribution of the multimedia content to the remote network device 114, via L2TP/IPSec secure connections for example, the gateway network device 110 may simply copy the VLAN tag field 160 in Ethernet frame 142 into the inner VLAN tag field 164 in Ethernet frame 142 to preserve content provider VLAN data, including any included unique VIDs. The gateway network device 110 may then set the outer VLAN tag field 162 to ensure secure communication of the Ethernet packet to the remote network device 114. For example, the VID parameter in the outer VLAN tag field 162 may be set to value associated with the particular secure connection 116 for example.

Figure 2A:
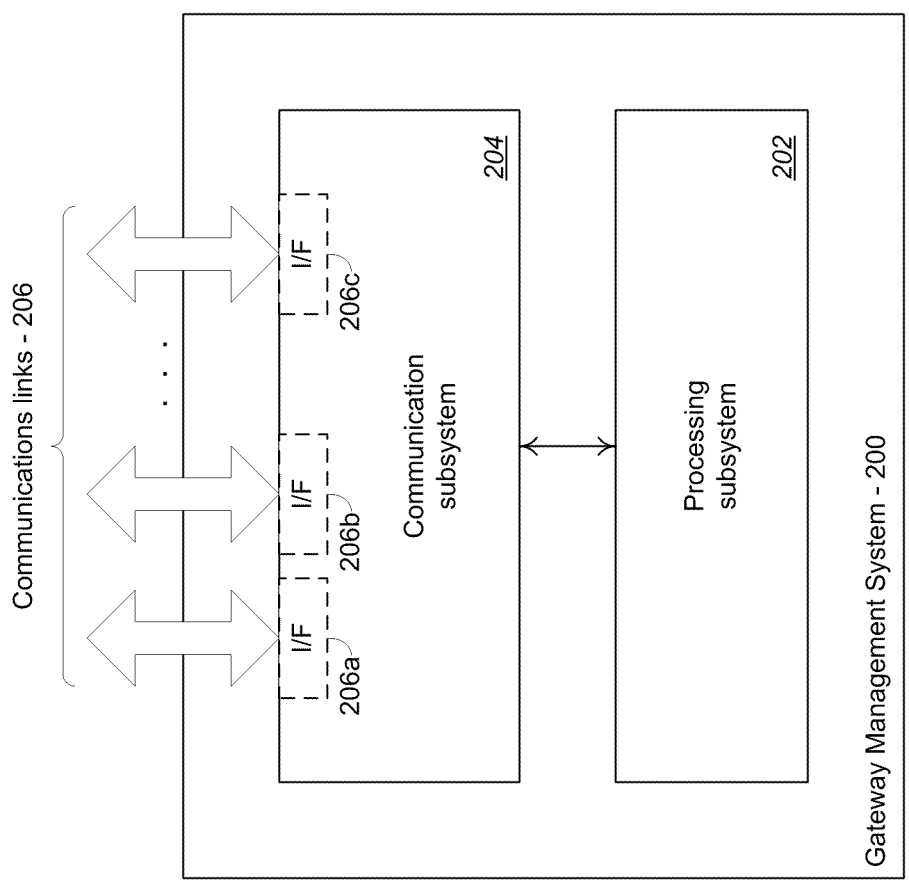
FIG. 2A is a block diagram that illustrates an exemplary gateway management system that enables distributing multimedia content to both local and remote devices, in accordance with an embodiment of the invention.

FIG. 2A is a block diagram that illustrates an exemplary gateway management system that enables distributing multimedia content to both local and remote devices, in accordance with an embodiment of the invention. Referring to FIG. 2A, there is shown a gateway management system 200 comprising a processing subsystem 202 and a communication subsystem 204.

The gateway management system 200 may comprise the processing subsystem 202, the communication subsystem 204, and suitable logic, circuitry, interfaces, and/or code that may enable performing, managing, and/or controlling multimedia content distribution by a gateway network device via a plurality of communication interfaces 206*a*, . . . , 206*c*. The communication interfaces 206*a*, . . . , 206*c* may comprise, for example, an optical fiber interface, a twisted pair based interface, a WiFi interface, a WiMAX interface, a cellular interface, a femtocell interface, and/or a satellite interface.

The processing subsystem 202 may comprise suitable logic, circuitry, interfaces, and/or code that may be operable to provide processing operations, including data and/or signal processing, to facilitate communications via the communication subsystem 204. The processing subsystem 202 may also comprise suitable logic, circuitry, interfaces, and/or code that may enable providing management and/or control operations in the gateway management system 200. For example, the processing subsystem 202 may enable generating control signals that may enable controlling transmission and/or reception of packets and/or data via the communication subsystem 204.

The communication subsystem 204 may comprise suitable logic, circuitry, interfaces and/or code that may be operable to perform data and/or packet transmission and/or reception via the plurality of communication interfaces 206*a*, . . . , 206*c*. While the gateway management system 200 is shown to comprise both processing subsystem 202, the communication subsystem 204, the invention need not be so limited. In some embodiments of the invention, at least some of the components and/or functions described herein may be correspond to external devices and/or systems. For example, dedicated communication systems and/or devices may be utilized to perform the RF communication operations of the communication subsystem 204.

In operation, the gateway management system 200 may be integrated in a device, for example the gateway network device 110, to provide management operations during multimedia content distribution.

The communication subsystem 204 may be operable to enable reception and/or transmission or packets used to communicate multimedia content via the gateway network device 110. One or more of the communication interfaces 206*a*, . . . , 206*c* may be used to facilitate reception of packets communicated by the service/content providers 124*a* and 124*b* to the gateway network device 110; while other interfaces may be used to communicated the packets to the local network devices 112*a* and/or 112*b*, substantially as described with regard to, for example, FIG. 1A.

The processing subsystem 202 may be operable to control and/or manage the operations of the communication subsystem 204, based on, for example, feedback provided via the communication subsystem 204, predefined and/or dynamically determined information, and/or based on input provided to the gateway management system 200, by the gateway network device 110 and/or its user. The processing subsystem 202 may also be operable to provide processing operations during reception and/or transmission of packets carrying multimedia content via the gateway network device 110. For example, the processing subsystem 202 may perform necessary VLAN and/or DRM/DTCP related operations to limit and/or secure use of the multimedia content based on requirement imposed by the service/content providers 124*a* and 124*b*.

In an exemplary aspect of the invention, the processing subsystem 202 and the communication subsystem 204 may enable secure distribution of multimedia content via the gateway network device 110 to remote network devices. For example, one or more of the communication interfaces 06*a*, . . . , 206*c* may be used to facilitate communication of packets between the gateway network device 110 and the remote network device 114, via the secure connection 116, substantially as described with regard to, for example, FIG. 1A. In addition, the processing subsystem 202 may be operable to perform, for example, necessary L2TP/IPSec and/or VLAN double-tagging processing that may be required to facilitate communication of otherwise restricted multimedia content from the gateway network device 110 to the remote network device 114 via the secure connection 116.

Figure 2B:
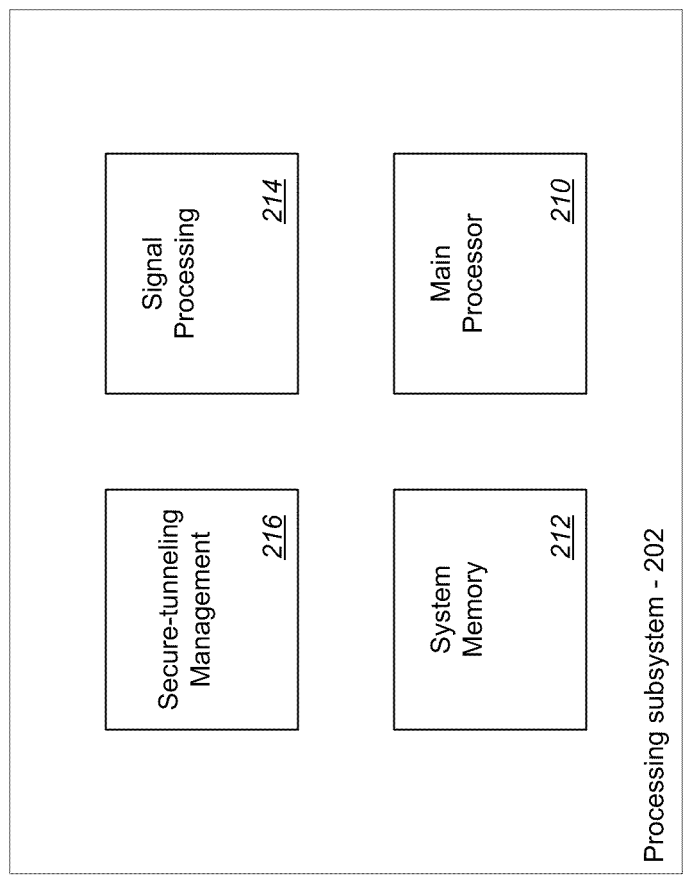
FIG. 2B is a block diagram that illustrates an exemplary processing subsystem in a gateway management system that enables distributing multimedia content to both local and remote devices, in accordance with an embodiment of the invention.

FIG. 2B is a block diagram that illustrates an exemplary processing subsystem in a gateway management system that enables distributing multimedia content to both local and remote devices, in accordance with an embodiment of the invention. Referring to FIG. 2B, there is shown the processing subsystem 202 comprising a main processor 210, a system memory 212, a signal processing module 214, and a secure tunneling management module 216.

The processing subsystem 202 may comprise the main processor 210, the system memory 212, the signal processing module 214, the secure tunneling management module 216, and/or suitable logic, circuitry, interfaces, and/or code that may enable provide multimedia content distribution management operations as described with regards to FIG. 2A.

The main processor 210 may comprise suitable logic, circuitry, interfaces, and/or code that may enable controlling, managing and/or supporting processing operations in the processing subsystem 202, and/or the gateway management system 200. The main processor 210 may be utilized to control at least a portion of the system memory 212, the signal processing module 214, the secure tunneling management module 216, and/or the communication subsystem 204. In this regard, the main processor 210 may generate, for example, signals for controlling operations within the processing subsystem 202 and/or the communication subsystem 204. The main processor 210 may also enable execution of applications that may be utilized by the processing subsystem 202. The invention need not be limited to a specific processor, and the main processor 210 may comprise for example, a general purpose processor, a specialized processor or any combination of suitable hardware, firmware, software and/or code, which may be enabled to support and/or control operations of the gateway management system 200.

The system memory 212 may comprise suitable logic, circuitry, interfaces, and/or code that may enable permanent and/or non-permanent storage and/or fetch of data, code and/ or other information used in the processing subsystem 202 and/or the communication subsystem 204. In this regard, the system memory 212 may comprise different memory technologies, including, for example, read-only memory (ROM), random access memory (RAM), and/or Flash memory. The system memory 212 may be utilized, for example, for storage of configuration data and/or execution code that is utilized by the main processor 210. The system memory 212 may also be utilized to store configuration information which may be utilized to control the operations of at least a portion of the communication subsystem 204.

The signal processing module 214 may comprise suitable logic, circuitry, interfaces, and/or code that may provide dedicated processing operations during transmission and/or reception operations in the gateway management system 200 based on one or more wired and/or wireless interfaces. The signal processing module 214 may enable, for example, processing of baseband signals during reception of RF signals via the communication subsystem 204. The signal processing module 214 may also be operable to generate control and/or processing signals, such as local oscillator signals, to facilitate performing conversion and/or modulation operations during reception of RF signals. Although the signal processing module 214 may be depicted as a single block, the invention need not be so limited. Accordingly, other embodiments of the invention may comprise a plurality of baseband processors for processing signals for one or more available RF transceivers.

The secure tunneling management module 216 may comprise suitable logic, circuitry, interfaces, and/or code that may be operable to establish, manage, and/or control secure connections that be used to enable distribution of multimedia content to a plurality of remote devices.

In operation, the processing subsystem 202 may be operable to control and/or manage the operations of the communication subsystem 204. The main processor 210 and/or the signal processing module 214 may enable configuring of the communication subsystem 204, based on configuration information stored via the system memory 212 for example, to facilitate reception of RF signals via wired and/or wireless interfaces supported via the communication subsystem 204. The main processor 210 may also enable processing feedback provided via the communication subsystem 204, utilizing, for example, predefined parameters stored via the system memory 212, dynamically determined information during processing operations, and/or input provided into the gateway management system 200. For example, the main processor 210 and/or the signal processing module 214 may configure and/or manage the communication subsystem 204 during reception and/or transmission of packets that may be used to carry multimedia content received, and/or distributed by the gateway network device 110.

In an exemplary embodiment of the invention, the secure tunneling management module 216 may be operable to establish and/or manage secure connections that may be used to enable the gateway network device 110 to distribute multimedia content to remote network devices, for example the remote network device 114. For example, the secure tunneling management module 216 may provide control signals and/or data that may enable the main processor 210 and/or the signal processing module 214 to use the communication subsystem 204 to establish and/or use L2TP/IPSec tunneling connection via one or more of the communication interfaces 206a, ..., 206c supported via the communication subsystem 204. In this regard, the secure tunneling management module 216 may perform directly, or manage performance of IPSec encryption and/or L2TP data encapsulation of multimedia content communicated via the secure connection 116 between the gateway network device 110 and the remote network device 114. The secure tunneling management module 216 may also enable performing necessary VLAN double-tagging to facilitate secure distribution of the multimedia content to the remote network device 114. For example, the secure tunneling management module 216 may manage extraction of VIDs from packets based on Ethernet frame 142, received from the service/content providers 124a and 124b. The secure tunneling management module 216 may then reuse those extracted VIDs to setup the inner VLAN tag field 164 in packets based on the Ethernet frame 144, which may be used to communicate the multimedia content to the remote network device 114. The secure tunneling management module 216 may setup the outer VLAN tag field 162, in the Ethernet frame 144, which may be utilized to communicate the multimedia content to the remote network device 114 to enable routing those packets to the remote network device 114 via the broadband network 122.

Figure 3:
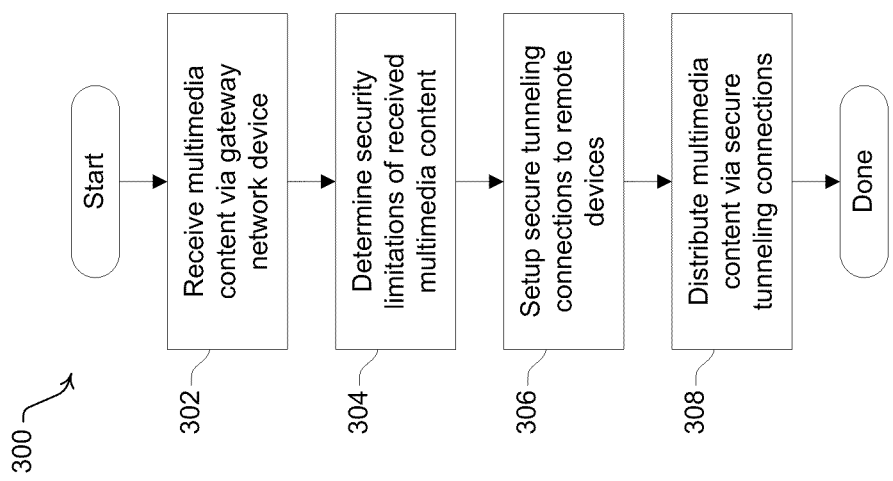
FIG. 3 is a flow chart that illustrates use of gateway device to distribute multimedia content to remote devices, in accordance with an embodiment of the invention.

FIG. 3 is a flow chart that illustrates use of gateway device to distribute multimedia content to remote devices, in accordance with an embodiment of the invention. Referring to FIG. 3, there is shown a flow chart 300 comprising a plurality of exemplary steps that may be utilized to enable distribution of multimedia content to remote devices.

In step 302, a gateway network device may receive multimedia content communicated by one or more service/content providers. For example, the gateway network device 110 may receive multimedia content communicated by service/content providers 124a and/or 124b, via VLAN based connections 120a and 120b, respectively. The multimedia content may be communicated via the Broadband 122, using packets that may be based on the Ethernet frame 142, which may allow the service/content providers 124a and/or 124b to set VID parameter in the VLAN tag field 160 to unique values that limit and/or restrict use of the communicated multimedia content. In step 304, the security limitations of received multimedia content may be determined. For example, once the gateway network device 110 receives the packets communicated by the service/content providers 124a and 124b, the gateway network device may perform necessary processing operations, via the processing subsystem 202, to determine the security limitation imposed by the service/content providers 124a and 124b as to the received multimedia content. The use and/or distribution of the multimedia content may be restricted based on VLAN tagging and/or based on use of DRM policies, including, for example, the DTCP standard.

In step 306, secure connections to remote devices may be setup to enable secure distribution of multimedia content beyond a narrow geographical area to which the use of the multimedia content may otherwise be restricted. For example, the gateway network device 110 may establish the secure connection 116, based on L2TP/IPSec secure tunneling for example, to the remote network device 114 to facilitate distribution of multimedia content that may otherwise be restricted to the location 106. In step 308, the multimedia content may be distributed via secure tunneling connections to remote devices. For example, the gateway network device 110 may distribute multimedia content to the remote network device 114 via the secure connection 116. In an exemplary embodiment of the invention, VLAN double-tagging may be utilized to enable expanding the VLAN space used by the gateway network device 110 securely to the remote network device 114. For example, packets based on the double VLAN-tag Ethernet frame 144 may be used to enable implementing VLAN grouping between the gateway network device 110 and the remote device 114 while at the same time maintaining the VLAN grouping used by the service/content providers 124a and 124b to restrict use of communicated multimedia content.

Various embodiments of the invention may comprise a method and system for integrating remote devices into a domestic VLAN. The gateway network device 110 may establish, via the gateway management system 200, secure connections with a plurality of remote network devices, for example secure connection 116 to the remote network device 114, to distribute via the secure connections multimedia content received by the gateway network device 110 from service/content providers 124a and/or 124bs 124a and/or 124b. The consumption of the multimedia content may originally be restricted to a plurality of local network devices, including the local network devices 112a and/or 112b, which may be communicatively coupled to a local network associated with the gateway network device 110 in the location 106. The remote network device 114 may not originally be authorized to consume the distributed multimedia content prior to the distribution by the gateway network device 110, due to geographical remoteness for example. The secure connection 116 may be established using one or more tunneling protocols. The secure connection 116 may be set up using layer 2 tunneling protocol (L2TP), and such L2TP based tunneling connection may be secured using Internet Protocol Security (IPSec). Use of the multimedia content may be restricted based on a Digital Rights Management (DRM) policy of service/content providers 124a and/or 124b. The DRM policy may be implemented using Digital Transmission Content Protection (DTCP) protocol, which may restrict use of the multimedia content based on roundtrip times and/or IP subnetting. Each of service/content providers 124a and/or 124b may utilize one or more VIDs during communication of the multimedia content to the gateway network device 110. The gateway network device 110 may also associate with each secure connection an additional VID that may be used to tag packets used to communicate the multimedia content to the remote network devices. Consequently, multimedia content distribution to remote network devices may comprise communicating double VLAN-tagged packets, based on the Ethernet frame 144, using the processing subsystem 202 and/or the communication subsystem 204 in the gateway management system 200 to remote network devices during the distribution of multimedia content.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for integrating remote devices into a domestic VLAN.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
    at a gateway network device,
        receiving from a provider multimedia content, including
            receiving one or more virtual local area network (VLAN) identifiers to establish VLAN grouping restricting consumption of the received multimedia content to one or more devices communicatively coupled to a local area network associated with the gateway network device;

establishing one or more secure connections between the gateway network device and one or more remote network devices;

associating one or more different VLAN identifiers with each of the one or more secure connections;

packetizing the received multimedia content into one or more packets for communication via the one or more secure connections;

tagging the one or more packets with a different VLAN identifier corresponding to a particular secure connection of the one or more secure connections to implement VLAN grouping between the gateway network device and a particular remote network device of the one or more remote network devices while maintaining VLAN grouping used to restrict consumption of distributed multimedia content; and distributing the packetized multimedia content according to a Digital Rights Management (DRM) policy of the provider of the multimedia content.

2. The method of claim 1 wherein tagging the one or more packets with a different VLAN identifier comprises:

adding to the one or more packets a VLAN identifier specified by the gateway network device.

3. The method of claim 1 further comprising:

receiving the one or more data frames including data defining the multimedia content and a VLAN tag established by the provider to restrict the consumption of the received multimedia content to the one or more devices communicatively coupled to the local area network associated with the gateway network device;

copying the VLAN tag from the received one or more data frames to the tagged one or more packets; and adding a second VLAN tag to the tagged one or more packets.

4. The method of claim 3 further comprising:

setting the second VLAN tag to a value associated with the particular secure connection.

5. A system for networking, the system comprising:

one or more circuits in a gateway network device that are operable to establish one or more secure connections between said gateway network device and one or more remote network devices utilizing one or more tunneling protocols; and said one or more circuits are operable to distribute multimedia content from said gateway network device to said one or more remote network devices via said one or more secure connections, wherein:

use of said multimedia content is restricted based on a Digital Rights Management (DRM) policy of a provider of said multimedia content and wherein consumption of said distributed multimedia content was originally restricted by said DRM policy to one or more devices communicatively coupled to a local network associated with said gateway network device; and said one or more or more remote network devices were not originally authorized under said DRM policy to consume said distributed multimedia content prior to said distribution, the use of the one or more secure connections between said gateway network device and said one or more remote network devices operative to simulate requirements of the said DRM policy which otherwise limit distribution of said distributed multimedia content to the one or more devices communicatively coupled to the local network associated with said gateway network device and restrict use of said distributed multimedia content by said one or more devices;

wherein one or more VLAN identifiers are utilized to establish VLAN grouping to restrict consumption of communicated multimedia content to the one or more devices communicatively coupled to the local network associated with said gateway network device during communication of said multimedia content to said gateway network device; and said one or more circuits are operable to associate one or more different VLAN identifiers with each of said one or more secure connections;

said one more circuits are operable to packetize said multimedia content into one or more packets for communication via said secure connections; and said one more circuits are operable tag said one or more packets with a different VLAN identifier corresponding to one of said one or more secure connections prior to communicating said one or more packets via a particular secure connection to implement VLAN grouping between the gateway network device and the one or more remote network devices while maintaining VLAN grouping used to restrict consumption of distributed multimedia content.

6. The system according to claim 5, wherein said multimedia content is received from one or more content providers.

7. The system according to claim 5, wherein said one or more circuits are operable to set up said one or more secure connections using layer 2 tunneling protocol (L2TP).

8. The system according to claim 7, wherein said one or more circuits are operable to secure said L2TP based tunneling connections using Internet Protocol Security (IPSec).

9. The system according to claim 7, wherein said one or more circuits are operable to implement said DRM policy using Digital Transmission Content Protection (DTCP) standard.

10. The system according to claim 9, wherein said one or more circuits are operable to restrict use of said multimedia content via said DTCP standard based on an IP subnet associated with said gateway network device.

11. The system according to claim 9, wherein said one or more circuits are operable to restrict use of said multimedia content via said DTCP standard based on roundtrip times.

* * * * *